(12) United States Patent
Kuffner et al.

(10) Patent No.: US 8,254,844 B2
(45) Date of Patent: Aug. 28, 2012

(54) METHOD AND APPARATUS FOR UTILIZING A TRANSMISSION POLARIZATION TO REDUCE INTERFERENCE WITH A PRIMARY INCUMBENT SIGNAL

(75) Inventors: Stephen L. Kuffner, Algonquin, IL (US); Gregory J. Buchwald, Crystal Lake, IL (US); David P. Gurney, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 397 days.

(21) Appl. No.: 12/475,004

(22) Filed: May 29, 2009

(65) Prior Publication Data

US 2010/0304680 A1  Dec. 2, 2010

(51) Int. Cl.
*H04B 1/00* (2006.01)
*H04B 15/00* (2006.01)
(52) U.S. Cl. ...................... 455/63.4; 455/454
(58) Field of Classification Search .................. 455/447, 455/448, 450, 452.1, 509, 63.1, 63.4, 66.1, 455/67.11
See application file for complete search history.

(56) References Cited

U.S. PATENT DOCUMENTS

| 7,003,058 | B2 | 2/2006 | Bach et al. |
| 2003/0203733 | A1* | 10/2003 | Sharon ........................... 455/427 |
| 2004/0127175 | A1 | 7/2004 | Lucidarme et al. |
| 2005/0143062 | A1* | 6/2005 | Dowling ........................ 455/423 |
| 2008/0090581 | A1* | 4/2008 | Hu ............................. 455/452.1 |
| 2009/0227260 | A1* | 9/2009 | Anreddy et al. .............. 455/450 |

OTHER PUBLICATIONS

Federal Communications Commission (FCC 03-322)—Facilitating Opportunities for Flexible, Efficient, and Reliable Spectrum Use Employing Cognitive Radio Technologies—Notice of Proposed Rule Making and Order—Adopted: Dec. 17, 2003—Released: Dec. 30, 2003—Citing: Section 24 at p. 10 and Footnote 80 at p. 27.

* cited by examiner

*Primary Examiner* — Ping Hsieh
(74) *Attorney, Agent, or Firm* — Barbara R. Doutre

(57) ABSTRACT

A mobile station (104) operates in a region where an incumbent operator (110) is transmitting. The secondary station transmits at a frequency similar to that of the incumbent operator's signal. The incumbent operator transmits using a particular polarization (113). To reduce interference, the secondary station selects one of a plurality of antennas of the secondary station which has a low matching polarization with that of the incumbent signal.

23 Claims, 6 Drawing Sheets

METHOD AND APPARATUS FOR UTILIZING A TRANSMISSION POLARIZATION TO REDUCE INTERFERENCE WITH A PRIMARY INCUMBENT SIGNAL

FIELD OF THE INVENTION

The invention relates generally to cognitive radio systems, and more particularly to reducing interference when transmitting on a channel having an incumbent signal.

BACKGROUND OF THE INVENTION

As a result of increased use of wireless communication systems, the demand for radio spectrum and spectrum-efficient systems is also increasing. One approach to easing the demand for spectrum is the so-called "secondary use" mode of operation where a radio device or system is allowed to use an unused or lightly used portion of spectrum otherwise restricted to primary users. Primary users are typically licensed by an appropriate authority to use one or more channels in a reserved spectrum region, if not an entire spectrum region. Examples of primary users include incumbent services such as television and commercial broadcast radio, as well as land mobile radio systems or public safety radio systems. Each of these systems, as well as other primary systems, are typically licensed operators and as such have an exclusive right to operate in a designated spectrum region or channel. However, some frequencies in these reserved spectrum bands may be unoccupied. For example, even in heavily populated metropolitan regions, there are typically unused television channels. These unused frequencies or channels may be made available for secondary use, provided the secondary users comply with certain regulations.

A secondary user must first check a candidate channel to determine if there is an incumbent on the channel, or substantially near (in frequency) the candidate channel. The incumbent may be a primary operator, or another secondary user. The incumbent may be transmitting directly on the channel, or in a spectrum substantially adjacent to the candidate channel or partially overlapping the candidate channel. The presence of a strong incumbent signal may eliminate the candidate channel from consideration for secondary use. However, if the strength of the incumbent signal is sufficiently weak, or the separation between the primary and secondary user is great enough, as may be indicated by a geo-location database, the secondary user may be able to use the candidate channel so long as there is sufficiently low interference with the incumbent signal being received at nearby receivers tuned to receive the incumbent signal.

Typically, the secondary user using sensing techniques for spectrum access has no recourse if an incumbent signal strength is at a threshold level, but not low enough to allow secondary transmission on the candidate channel. A secondary user may also reduce the power of its transmissions to avoid interfering with an incumbent. Accordingly, there is a need for a means by which a secondary user can reduce interference with an incumbent signal to allow or expand use of a candidate channel in the presence of an incumbent signal.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
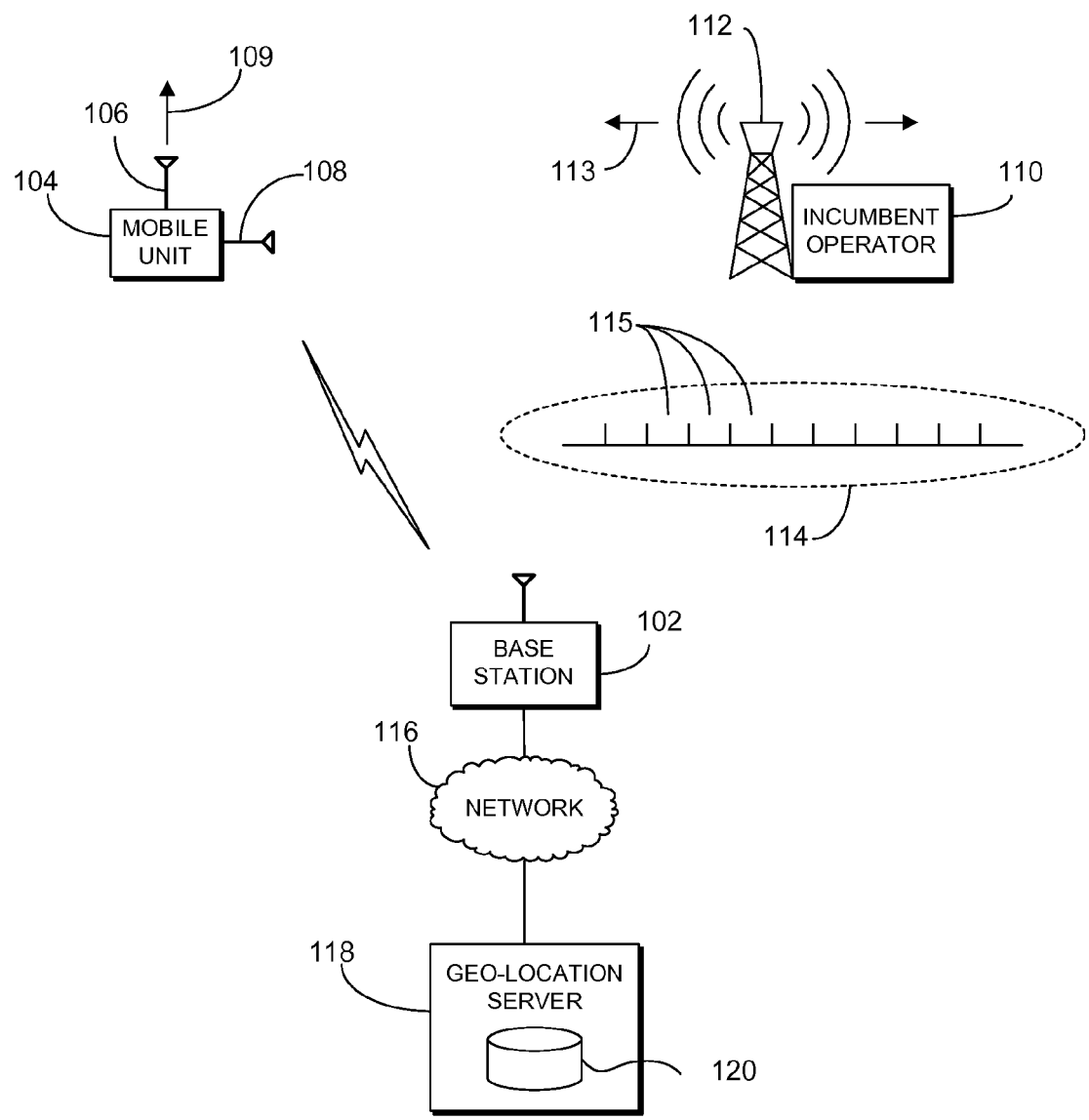
FIG. 1 shows a system diagram of a radio system employing adaptive transmit polarization as contemplated by one embodiment of the invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The invention mitigates the problem of interfering with other receivers while operating in radio proximity (frequency and space) by utilizing a transmit polarization configuration which minimizes interference with the other receivers that are not intended targets. Note that the polarization of transmitted signals in many systems is often consistent over much of the coverage area. The invention is particularly suited for secondary-use operation, where the radio employing the invention is operating on a frequency or channel in or near (in frequency) a spectrum region used by other operators. These other operators may be licensed incumbents in the spectrum region and have priority use of one or more frequencies or channels. In one embodiment of the invention, a secondary unit senses the ambient radio environment in a candidate channel using multiple antennas, each antenna having a different orientation or polarization. If there is an incumbent transmitter in or near the candidate channel, such as on a co-channel, adjacent channel, or alternate channel, the secondary unit determines the received signal strength each antenna produces when receiving the incumbent signal. Based on the received signal strength resultant at each antenna, a transmit power configuration is used to minimize a dominant interference effect the secondary unit will have upon transmitting. For example, the antenna producing the lowest received signal strength when receiving the incumbent signal may be used exclusively on the assumption that it has the lowest matching polarization with the incumbent signal. Alternatively, transmit power may be apportioned among antennas of the secondary unit when transmitting to both reduce an interference effect on non-target receivers, while maintaining a minimum level of performance with intended receivers. In this manner, interference to an incumbent system is generally minimized. Alternatively, the antenna utilized for transmission may also support transmitting at higher power levels while maintaining a fixed (or target) interference level to the incumbent. In this manner, secondary system communication range, throughput, or quality of service (QoS) may be increased. If there is no incumbent signal, and no indication of a nearby (in frequency) signal with which the secondary unit might interfere when the candidate channel is used by the secondary unit, the secondary unit may select the antenna having the best matching with another secondary unit in the system, or other entity to which the secondary unit will transmit.

Referring to FIG. 1, there is shown a system diagram of a radio system 100 employing adaptive transmit polarization as contemplated by an embodiment of the invention. The system may include a secondary base station 102 which provides a radio air interface in the vicinity of the base station. It will be appreciated by those skilled in the art that the secondary base station may be a base station which supports operation both as a primary operator in one frequency band as well as secondary operation in another band. One or more secondary units, such as mobile unit 104, may establish a radio link with the base station to be connected to other communication resources and communicate with other mobile units as well as other fixed stations, dispatchers, and so on. It will further be appreciated by those skilled in the art that the mobile unit 104 may equally be a fixed unit, and that it may engage in both primary operation in a reserved primary band, as well as secondary operation as described here. Mobile unit 104 conforms to an embodiment of the invention and comprises a plurality of antennas, such as antennas 106 and 108, each having a different polarization. As used herein, the term "polarization" refers to the relative orientation of the electric field produced by an antenna. Although most commonly defined with respect to the surface of the Earth, relative polarization may refer to the difference in physical orientation between two antennas. For example, antenna 106 may be a vertically oriented whip antenna which has a vertical polarization 109, referring to the orientation of its emitted electric field relative to the surface of the Earth, assuming antenna 106 is oriented vertically. Antenna 108 is cross-polarized (or orthogonally polarized) with respect to antenna 106, and has a horizontal orientation when antenna 106 has a vertical orientation. If mobile unit 104 is, for example, a handheld device, then the orientation of antennas 106 and 108 with respect to the Earth's surface will often change, but their orientation or relative polarization with respect to each other will remain constant.

In one embodiment of the invention, the base station and mobile unit may operate as secondary users in a portion of spectrum otherwise reserved for primary, and typically licensed operators. Secondary use may be regulated, requiring secondary users to take measures to avoid harmfully interfering with other, and especially primary, operators. A primary operator may be for example a television broadcaster, commercial radio broadcaster, land mobile radio operations, or other low power operators such a wireless microphone system. Primary operators occupy a channel or other spectrum portion, and are referred to generally as an incumbent operator. In the present example, an incumbent operator 110 transmits from an antenna 112 using a horizontal polarization 113, as is typical with television broadcasting. The base station, mobile unit, and incumbent operator 110 operate in a spectrum portion 114 which may be subdivided into channels 115. The channels may be wideband channels for use by licensed operators, such as incumbent operator 110. An example of a wideband channel would be television broadcast channels. The base station may define wideband or narrowband channels in unused primary channels for radio communication between the base station and mobile unit. To determine which wideband channels are available in the region where the base station is located, the base station may use a network 116, such as the Internet, to access a geo-location server 118. The geo-location server is coupled to a geo-location database 120. The geo-location database 120 contains records for licensed or other primary and/or secondary operators and their locations, and may further include other parameters such as transmit power level, antenna height, polarization (including sense) and pattern, and so on. A wide variety of information may be stored in association with each operator listed in the geo-location database. The base station, or a mobile station, may query the geo-location database via the geo-location server, and may provide the secondary station's present location. The base station may specify its location in common global coordinates, such as by specifying its latitude and longitude. The base station may be programmed with its surveyed coordinates, or it may be able to determine its own location by use of, for example, a satellite positioning receiver (e.g., GPS). Alternatively, one or more mobile units may query the geo-location database using their location, or the location of any other secondary node in the communication system if necessary. The base station 102 may also utilize spectral sensing techniques to determine available channels. Generally, regulatory agencies (such as the FCC in the U.S.) set specific detection threshold levels that incumbent signals must be measured below for secondary spectrum use to occur.

The base station may occasionally or periodically query the geo-location database to obtain a fresh listing of occupied as well as unused channels in the present region. The database may also indicate the maximum allowed transmit power level on each channel, which is typically determined by meeting some interference constraint (e.g., co-channel or adjacent channel interference limits) for incumbent systems operating in the region. The maximum allowed transmit power level may be determined in the database by propagation modeling the effect of the interfering secondary unit's transmitted signal on the nearest affected incumbent receiver, and applying the appropriate interference protection ratio for the incumbent type. The nearest incumbent receiver may be known, or derived using a statistical determination means and appropriate assumptions. Using that information, the base station may select one or more unused channels in which to operate. The selection process may involve sampling sub-channels in the unused wideband channels to determine if other secondary operators or incumbents in the region are transmitting in the channel. Between receiving the query results from the geo-location server and, or directly sensing the ambient radio conditions of the candidate channels, the base station can make a determination as to the radio operating environment, and select appropriate channels and transmit polarization configuration for use in communicating with mobile unit 104 and other mobile units. It is contemplated that the base station may register its selected channels or sub-channels with the geo-location server so that other secondary operators may be informed of the base station's presence. The transmit polarization of primary and secondary operators may be provided in the information returned by the geo-location server in response to the base station's query, allowing the base station and mobile unit to select a different polarization to minimize interference between the secondary communication system and other primary or secondary operators. Alternatively, or additionally, the base station or mobile unit may sense or otherwise detect the polarization of incumbent operators by receiving on different antennas having unique orientations, such as antennas 106 and 108. The antenna receiving the incumbent operator's signal at the lowest signal strength will typically have the lowest matching polarization (or coupling) with the incumbent operator's signal. Typically, such sensing would be performed occasionally or at periodic intervals to account for any motion in the system (e.g., of the transmitter, receiver, or environment). Note that by utilizing a transmit antenna polarization having a low matching with an incumbent signal, the transmit power of secondary device (e.g., 102 or 104) may be increased by a corresponding amount, thereby increasing secondary system range, throughput, or reliability, while maintaining a specified interference potential with the incumbent receiver. Note that the maximum tolerable interference level at an incumbent receiver is often dictated by regulations for secondary use of the band, and the specific type of system (e.g., analog TV receivers, digital TV receivers, etc.) that is being protected from interference.

As mentioned, in absence of access to a geo-location database, or in addition to database access, the base station and/or the mobile unit 104 may commence a sensing regimen to determine the presence, signal strength, and polarization of other radio operators in the region that are transmitting in the region. The signal strength of identifiable signals, such as television signals, may be used to determine whether the mobile unit or base station are within a defined coverage area of the signal transmitter. That is, while the mobile unit or base station may be able to receive a signal, it may be of such a low signal strength as to be below a government regulated threshold (e.g., −114 dBm in the U.S. TV bands), indicating the channel may be available for secondary use. However, the mobile unit and base station may use a different antenna polarization than that of the primary operator's signal to minimize interference with primary receivers in the vicinity of the base station or mobile unit. This method can also allow spectrum access that would otherwise be denied. For example, if an incumbent signal is sensed at −112 dBm (for the −114 dBm U.S. regulatory threshold example above) using a horizontal antenna polarization, that polarization could not be utilized for transmission by the unit 104. However, if the same signal were sensed at −118 dBm using a vertical antenna polarization, the channel could be utilized for transmission by unit 104. It will often be the case that an incumbent signal is sensed at levels on one antenna polarization that are far below the levels sensed on another antenna polarization, due to the inherent polarization of the incumbent signal.

Figure 2:
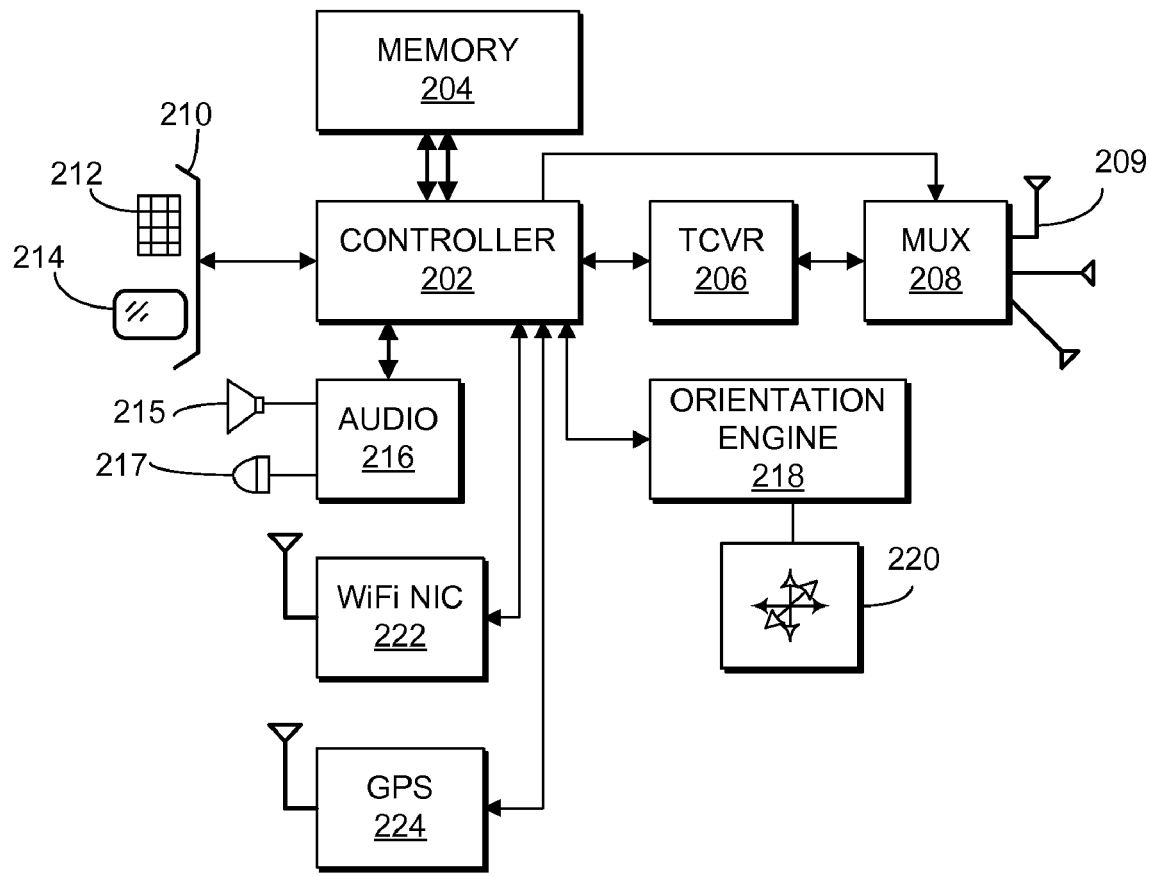
FIG. 2 shows a block schematic diagram of a mobile station which employs adaptive antenna polarization, in accordance with an embodiment of the invention.

FIG. 2 shows a block diagram of a secondary station 200 which employs adaptive antenna polarization, in accordance with an embodiment of the invention. The secondary station 200 may be equivalent to mobile unit 104 of FIG. 1, or have a different design. The secondary station may be a hand-held unit, a vehicle-mounted unit, or a fixed site radio design. The secondary station and base station may employ cognitive radio principles to adapt to various radio environments and ambient radio conditions. Operation of the secondary station may be accomplished by a controller 202. The controller is configured to control operation of the secondary station, and may utilize microprocessor elements for performing instructions provided by instruction code stored in memory 204. The controller may include various registers, logic, and arithmetic units, memory cache, input and output ports, and so on, as is well known. The memory may include ROM or reprogrammable non-volatile storage for storing instruction code including system parameters, kernel code, runtime code, applications, application protocol interface code sections, and so on, as is also well known. The memory may further include memory elements for runtime operation such as RAM. Upon powering up the secondary station, a kernel may be executed which loads operating system code and higher level code into runtime memory and then commences execution in accordance with an operating system and other software elements. The instruction code includes code for performing the inventive principles shown and taught herein, as well as other ordinary functions and operations.

The controller is operatively coupled to a radio transceiver 206. The transceiver typically comprises radio circuitry for modulating, demodulating, amplifying, filtering, frequency generation and tuning, as well as buffers, transmit/receive switch, digital to analog and analog to digital conversion. Typically, the transceiver is a digital transceiver and may include a digital signal processor which has its own memory, operating according to its own instruction code set, and interacting with the controller 202 to perform tasks under direction of the controller 202. The transceiver is further coupled to an antenna multiplexer 208, which allows the transceiver to be selectively or partially coupled to one or more of a plurality of antennas such as antenna 209. It is contemplated that, while in some embodiments of the invention only one antenna may be used to transmit, in other embodiments a configuration may be used which apportions transmit power to several antennas such that an antenna having a lowest coupling (due to polarization) with an incumbent operator receives the most transmit power. Each of the plurality of antennas are arranged to have differing orientations so as to produce differently polarized signals. The multiplexer may also contain phasing circuitry, to adjust the phase of outgoing signals. Note that when a given antenna is utilized for operation, it will generally receive signals having a like polarization at a higher level and reduce the received strength of signals having a different polarization. During operation, the secondary station may operate on a frequency near that of some other operator which is transmitting using a particular polarization. To reduce interference, the secondary station may determine the transmission polarization that least matches another operator, or select one of the plurality of antennas having the lowest matching polarity with another operator. Note that a dominant interference mechanism may be present in the system, which is often the limiting factor in determining maximum allowable transmit power for the secondary system, as is discussed herein below.

The secondary station further comprises user interface elements 210 to facilitate operator control of the station. Typical user interface elements include a keypad 212 and other buttons and tactile input means, and a graphical display 214 for displaying information. The secondary station may also include an audio system 216, including a speaker 215 and microphone 217. The audio system may be used to receive speech or other acoustic audio signals from a user, convert the acoustic signals into analog electrical signals and further into digital signals. The digitized audio signals are provided to the transceiver for modulation and transmission. Likewise, signals received at the transceiver may include audio information which may be demodulated, digitized, and provided by the transceiver to the audio system to be converted into analog electrical signals and played over the speaker 215 to produce an audibly perceptible acoustic signal for the user to hear. The audio system may also be used to provide audible alerts, such as tones, rings, and so on, to alert the user to incoming message or other events, as well as to confirm receiving input from the user. The secondary station may be used to transmit other forms of digital data, such as encoded video streams, or other telemetry.

The secondary station may further comprise an orientation engine 218, which operates in conjunction with a multi-dimensional accelerometer 220. The accelerometer may be referred to as an orientation sensor or inclinometer, and may be similar to that used in modern portable electronics devices to determine the physical orientation of the mobile station, as well as changes in orientation. The orientation engine may be implemented in hardware logic or in software executed by the controller, and receives input from the accelerometer 220 to determine the orientation of the mobile or handheld station by determining the direction of gravitational acceleration. In one embodiment, the accelerometer may be comprised of an array of micro-electromechanical switches (MEMS) which have differing bias forces. Generally, arrays of MEMS devices are arranged in three orthogonal axes to sense force or thereby infer acceleration in each of the three directions corresponding to the axes. By continuously sampling the status of each MEMS switch, the orientation engine can determine orientation as well as movement and change of orientation of the mobile station. The determined orientation parameters may be provided to the controller to determine an appropriate antenna polarization, or select an appropriate antenna or antenna power configuration from among the plurality of antennas, as well as to change to a different antenna or antenna configuration if the orientation of the mobile station is changed to preserve the desired polarization during operation. One alternative to using an orientation engine and accelerometer is to periodically receive a signal having a known polarization, such as a nearby incumbent television signal, at each of the plurality of antennas, and determine which antenna produces the strongest (or weakest) received signal strength.

Another embodiment of the invention estimates the magnitude and phase of the sensed signal on a plurality of antennas and synthesizes a transmit polarization that is orthogonal to the sensed polarization. Consider a portable secondary unit that is not being held such that its antennas (e.g., a vertically polarized 106 and horizontally polarized 108 antenna referenced to the portable device) are in the vertical and horizontal polarization planes of the protected signal. In such a case, each of the secondary unit's antennas will intercept some projection of the sensed polarization 113 onto its antennas 106 and 108. Because of the rotation of the secondary unit in the protected signal coordinate system, neither antenna 106, 108 by itself can be completely orthogonal to the sensed polarization 113, but will have some projection onto the sensed polarization. However, by sensing the magnitude and phase of the projections of the sensed signal onto the secondary unit's antennas 106 and 108, the secondary unit can determine the polarization of the sensed signal relative to its coordinate system and synthesize an orthogonal polarization. This would generally require using a combination of transmit antennas (e.g., vertical and horizontal), and phasing the transmissions between the antennas as described below.

The secondary station may further comprise additional subsystems, such as a local area network interface controller (NIC) 222, sometimes referred to as a "WiFi" network interface controller. The WiFi NIC may be operated in accordance with one of the IEEE 802.11 specifications for wireless local area networks (WLAN). The WiFi NIC allows the mobile station to access alternative communication networks, such as data networks, including the Internet, via suitable access points or other WLAN base stations. Such networks may also be utilized to access geo-location databases, described above. Similarly, as personal area network interface controller may be provided (not shown) for connecting with devices and networks using, for example, wireless protocols such as that known in the industry as "Bluetooth." Another subsystem which may be included is a satellite positioning system, such as a global positioning satellite (GPS) receiver 224. The GPS receiver, as is well known, receives signals from several positioning satellites in orbit around the Earth, and decodes the different signals to determine the global position or geo-location of the secondary station. The position of the secondary station may be transmitted to a controlling base station and other entity to determine the proximity of the secondary station to coverage regions of other primary or secondary operators, as well as for other purposes.

Figure 3:
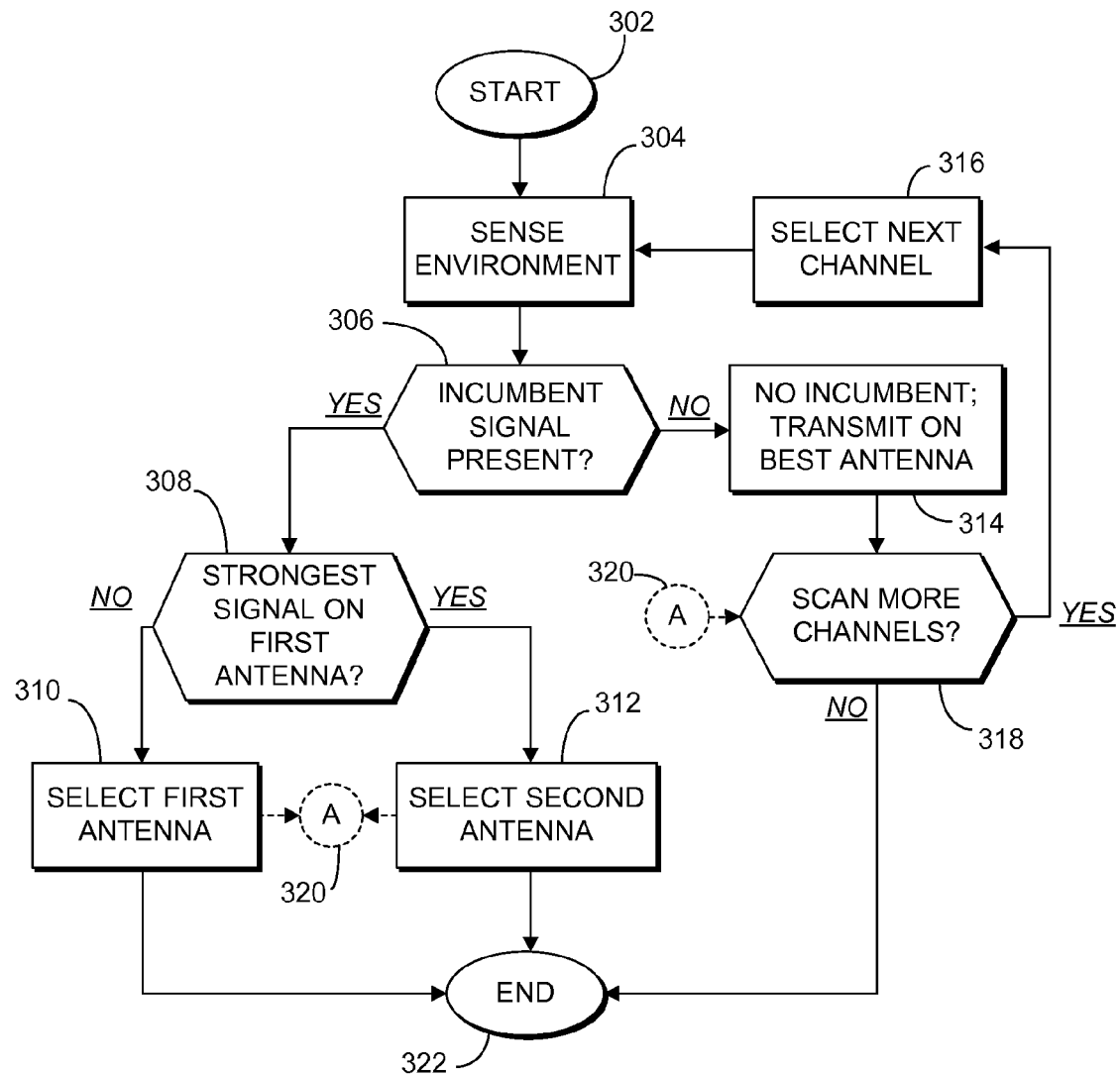
FIG. 3. shows a method of selecting an antenna for adaptive antenna polarization by a mobile station, as taught by an embodiment of the invention.

FIG. 3. shows a flow chart diagram of a method 300 of determining an adaptive antenna polarization configuration by a secondary station, as taught by one embodiment of the invention. The antenna polarization configuration refers to controlling the apportionment of transmit power among differently-oriented antennas of the station. In some configurations all transmit power may be routed through one antenna, and in other configurations the power may be split between two or more antenna to achieve a desired resultant polarization. The method illustrated here allows a secondary station, such as a base station or mobile subscriber station operating as secondary users, to sense the ambient radio environment and utilize an antenna polarization configuration without the need for externally acquired information, such as referring to, or querying a geo-location database. Briefly, the station senses the signal strength on a candidate channel, and selects an optimum polarization configuration based on the sensing results. If an incumbent signal is detected which indicates secondary operation may still be used, such as if the incumbent signal is not directly in the candidate channel, or is weak enough to be considered outside the range of the secondary system, the station selects an antenna polarization configuration to minimize its dominant interference effect. If no incumbent signal is sensed, or if the incumbent signal is so weak it may be disregarded, then an antenna polarization configuration that optimizes the link between the station and its intended target receiver may be used.

A secondary station, such as one designed similarly to that shown in FIG. 2, may be configured to perform in accordance with the following method by virtue of the controller 202 executing instruction code which results in the secondary station performing the method substantially as described. At the start (302) the secondary station is powered up and operational. A determination has been made to use or investigate the availability of spectrum which is not dedicated or reserved for the secondary station. The intended operation may be as a secondary operator in an unused portion of spectrum band otherwise reserved for other, primary operators, such as, for example, broadcast television or commercial radio bands. The secondary station may first sense the ambient radio environment (304) by tuning to selected frequencies or channels and sensing or measuring the received signal strength of any protected signals on the channel using each of a plurality of antennas and recording the signal strength received over each antenna. Knowing that the selected frequency or channel may be occupied by a particular type of operator, the sensing may include looking for a particular signal characteristic, such as a video or audio carrier of an NTSC television signal or a pilot signal component of a DTV television signal. Upon completion of the sensing, the secondary station determines whether there is an incumbent signal present in or overlapping the secondary system signal (306). Typically, the incumbent signal cannot be so strong as to indicate the secondary station is within a co-channel coverage area of the signal (since that may be a protected incumbent region). However, the incumbent signal may be, for example, on an adjacent channel, and as such, transmitting on the candidate channel being examined by the secondary station may interfere with the nearby (in frequency) incumbent. That is, a protected signal, such as an incumbent primary signal, is "on" the candidate channel if it is either in the candidate channel or sufficiently close in frequency that transmitting in the candidate channel may interfere with the protected signal. If a signal is detected the secondary station determines which antenna received at the highest received signal strength (308). In a simple example, the secondary station may have two antennas oriented at 90 degrees from each other. If a first antenna does not have the strongest signal strength, it is selected (310) for communicating on the channel. If the first antenna does have the highest received signal strength, then the second antenna is selected for secondary communication on the channel under consideration (312). If no incumbent signal is detected at step 314, then the secondary station selects the antenna having the best coupling with its associated base station, or other receiver, to produce the most favorable link conditions with the base station.

Again, note that a dominant interference effect may be present in the system, and would dictate the proper course of action. For example, if a close-by incumbent utilizing a horizontal transmitter polarization is present on an upper adjacent channel, and a distant incumbent (of the same type) is present using vertical polarization on a lower adjacent channel, the secondary station may choose to transmit using a horizontal antenna polarization, since that minimizes the dominant interference effect (to the distant incumbent, which limits overall secondary station transmit power, because it must protect the weaker incumbent signal from interference at nearby incumbent receivers). In this manner, secondary station transmit power, throughput, or range may be maximized, while maintaining adequate incumbent protection from interference. If the polarization matching the weaker incumbent signal had instead been utilized for secondary transmissions, it would cause more interference to the weaker incumbent signal, and the secondary unit would typically have to reduce it's transmit power to meet a fixed interference requirement (such as a desired to undesired interference ratio for the incumbent system). Regulatory agencies, such as the FCC, typically specify maximum desired to undesired (D/U) interference protection ratios for incumbent systems, while similar ratios may be determined for secondary systems depending on their required performance levels.

For example, FCC regulations in Television White Space (TVWS) in the U.S. require secondary unlicensed devices to provide no worse than a −33 dB D/U ratio to protect adjacent channel DTV service (i.e., the primary incumbent) from interference. DTV transmitters have pre-determined operating/coverage regions, defined by a protected service contour level (e.g., Grade B or Noise Limited Contour levels), which corresponds to a minimum received signal strength. For example, for full-power DTV transmitters in the U.S. operating in the UHF band, a protected service contour level of 41 dBu is specified. This level, along with various TV transmitter parameters (such as Effective Radiated Power, antenna height and pattern mentioned above) determines the TV transmitter's protected coverage area. When a secondary transmitter is operating outside of a TV transmitter's coverage area on an adjacent channel, it must ensure that its emissions received by a TV receiver on the nearest protected contour edge (or the nearest TV receiver if operating inside of an adjacent channel contour) do not exceed the specified adjacent channel interference limit (e.g., −33 dB D/U). Therefore, if the secondary transmitter is close to the protected contour edge, it must reduce it's transmit power level to ensure that its signal is received at the affected incumbent (TV) receiver at a level no more than 33 dB above the desired incumbent (TV) signal level. Other interference limits (e.g., 23 dB DTV co-channel D/U) may also be applied for co-channel incumbent signals. In this case, if a certain secondary unit transmit power level meets that constraint when transmitting using horizontal polarization (typically the same as the TV transmitter and TV receiver antenna), it may be able to transmit with substantially higher power levels (e.g., about 10 dB) using vertical polarization while still maintaining the same effective interference level into the incumbent TV receiver. This would typically result in increased coverage area or throughput for the secondary system.

Note that other incumbent interference protection ratios (e.g., co-channel D/Us) must typically be met by the secondary system. In some cases, the dominant interference effects (which limit secondary station transmit power level) may arise from co-channel interference protection requirements (as opposed to adjacent channel interference protection requirements). Also note that differing primary or incumbent systems (e.g., digital TV service compared to analog TV service) will typically have different interference protection requirements. All of these interference protection requirements (for all incumbents on co- and adjacent channels) will form a set of interference constraints that a secondary transmitter must meet. The dominant interference constraint (or criteria) that limits secondary station transmit power levels should determine which polarization is utilized by the secondary unit to minimize the dominant interference effect, since that effect ultimately limits secondary unit transmit power levels. In this manner, by carefully utilizing the appropriate (e.g., orthogonal) transmission polarization to the primary affected incumbent, effective interference levels (or interference coupling into the incumbent system) are minimized.

The secondary station may examine a number of candidate channels and record the results for each antenna utilized for sensing available candidate channels. Accordingly, after the determination of which antenna to use, either after step 314 or after one of steps 310, 312 as indicated by node 320, the secondary station determines if there are more channels to scan at step 318. If there are more channels to scan, then the secondary station selects the next channel (316) and repeats the method for the next channel. Otherwise, if there are no more channels to scan, or, if one of the antennas is selected at either step 310 or 312 the method is done and the method ends (322). When the method is finished, the secondary station may select a channel on which to operate, or return the scan results to the base station for evaluation so that the base station can select the best channel in view of results provided by other secondary stations.

Figure 4:
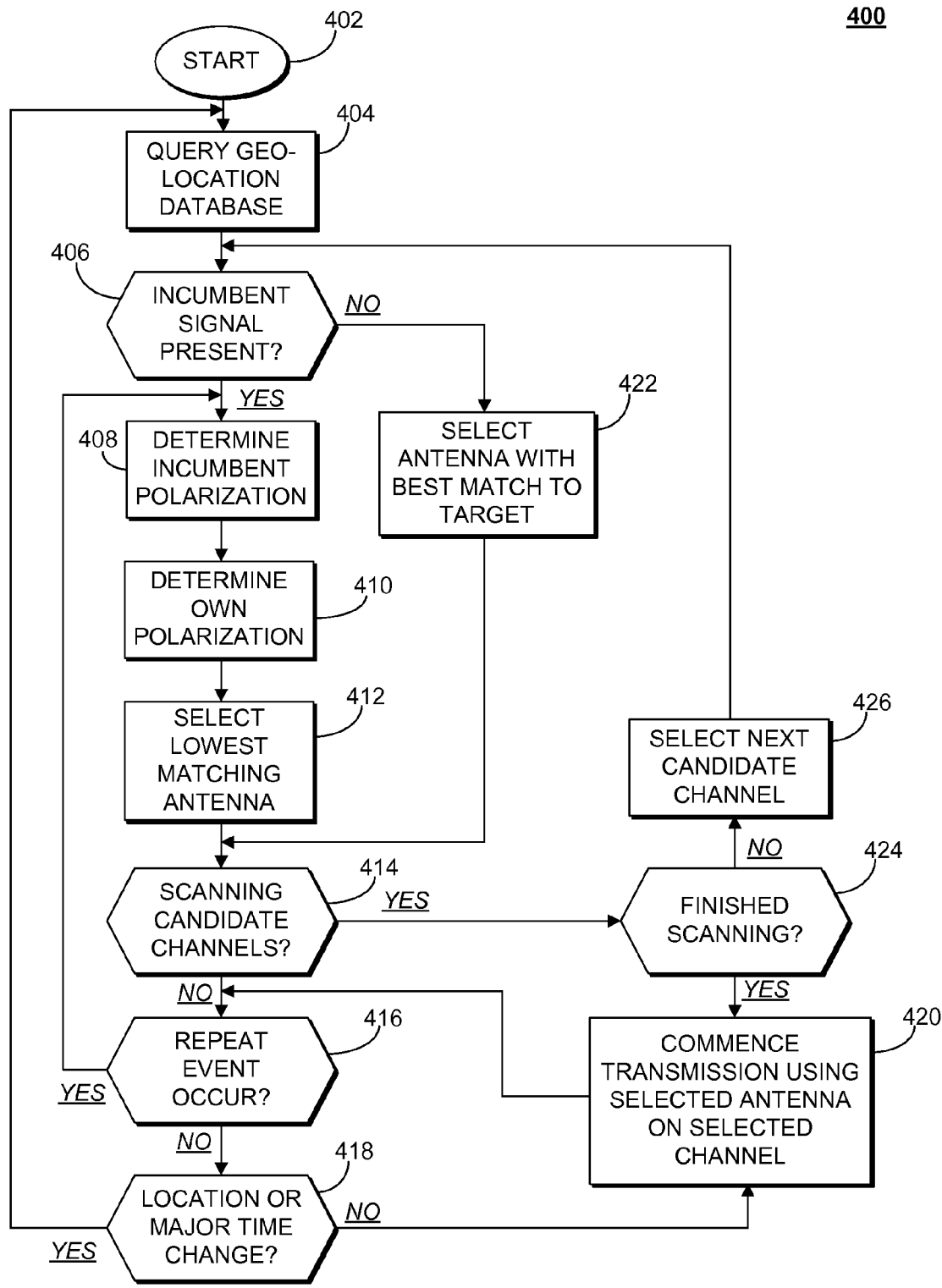
FIG. 4 shows a method of selecting an antenna for adaptive antenna polarization in accordance with an embodiment of the invention.

FIG. 4 shows a method 400 of selecting an antenna for adaptive antenna polarization in accordance with one embodiment of the invention. The present method illustrates an embodiment where a geo-location server or database is queried to obtain a better indication of available channels or spectrum. The method commences by communicating a query to a geo-location database (404). The query may be transmitted by any suitable communication means, including wired and wireless communication. The query may be performed by the mobile unit 104 or the base station 102, and includes the location of the secondary unit. The geo-location database typically returns results indicating available channels, and whether there are incumbent signals near channels being considered by the base station and mobile unit. The geo-location database may return a variety of signal parameters related to the incumbent signals, including a polarization indication parameter. Other parameters may indicate, for example, the coverage area by region or by measuring or predicting signal strength with respect to some reference. The method then commences to examining the query results and determining if there is an incumbent signal present (406). If an incumbent signal is present, the secondary station may commence determining the polarization of the incumbent (408), such as by sensing or by reference to the information provided by the geo-location database, and then determining its own orientation to determine the relative polarization of its antennas (410). The polarization of the incumbent may be provided in the query results, or the secondary station may have to determine the incumbent polarization by sampling the incumbent signal using differently oriented antennas of the secondary station. Given that the secondary device may be a handheld device, which may be moved, turned, and reoriented during use, the secondary station determines its present orientation first and knowing the orientation of the antennas mounted on or within the secondary station will allow a determination as to the orientation of those antennas with respect to the Earth's surface. Once the incumbent signal's polarization and the secondary station's orientation are determined, the secondary station then selects the antenna having the lowest matching polarization (412). In some embodiments the secondary station may scan several channels (414). The secondary station may periodically check to see if the method or portions of the method need to be repeated (416). A "repeat" event may be, for example, a change in orientation of the secondary station. If no such repeat event has occurred on the present iteration, the secondary station may check if there has been a passing of time since the last iteration of the method, or if the secondary station has substantially changed location (418). If so, then the method may be repeated. If such major event has not occurred, then the secondary station commences transmission on the selected antenna (420). Once communication commences, then the method repeats steps 416 and 418 periodically to determine if other actions need to be taken. In one embodiment, it is contemplated that the steps may be repeated periodically at some rate, such as every 50 milliseconds.

In step 406, upon determining that no incumbent signal is present, the secondary station may then select the antenna having the best matching orientation with the secondary base station or other stations with which it will communicate (422). The method may then commence to determining if other channels need to be scanned or examined at step 414. If the secondary station is examining other channels, the method commences to determining if the process of examining channels is finished (424). If the scanning process is finished, the method commences to step 420 and transmission may then commence. If there are other channels to be scanned, the secondary station then selects the next candidate channel and repeats the method (426).

The methods illustrated in FIGS. 3 and 4 allow, for example, a cognitive secondary station to select an antenna configuration of the plurality of antennas of the secondary station to reduce interference with other receivers receiving an incumbent signal nearby. The antenna configuration refers to the amount of transmit power routed to the antennas used to transmit. In some configurations only one antenna may be used while other configurations split power among two or more antennas. When an incumbent signal is detected on a candidate channel, the method commences by selecting an antenna from the plurality of antennas that has a lowest matching polarization with the incumbent signal. When no incumbent signal is detected on the candidate channel, the method commences by selecting an antenna from the plurality of antennas that has a highest matching polarization with a receiving station to which the secondary station is transmitting. It is possible that, instead of selecting only one of the plurality of antennas, two or more antennas may be used to transmit, as described above, but the transmitter may be configured such that at least a majority of transmit power is routed to one of the antennas having the lowest matching polarization with the incumbent signal.

Figure 6:
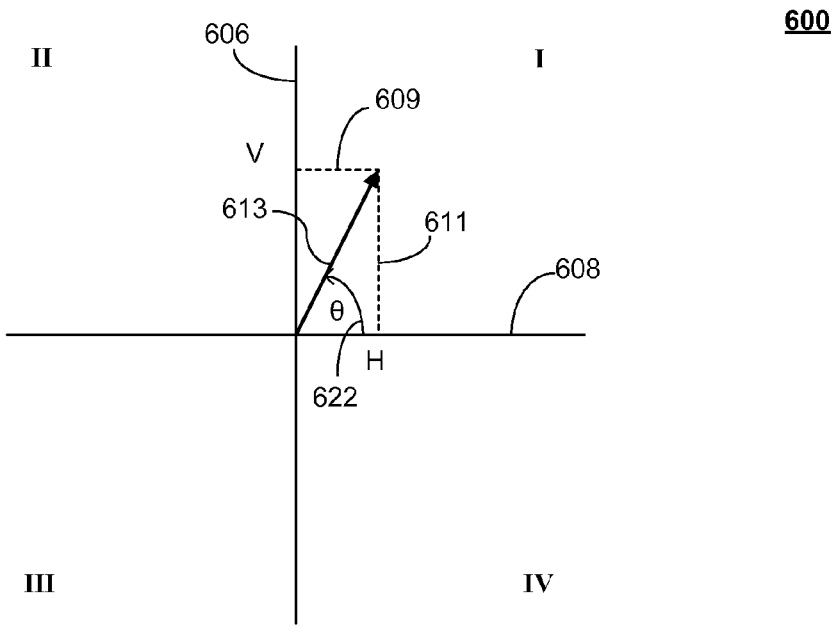
FIGS. 6 and 7 show polarization planes for synthesizing a signal having an orthogonal polarization to signal to be protected.
Figure 7:
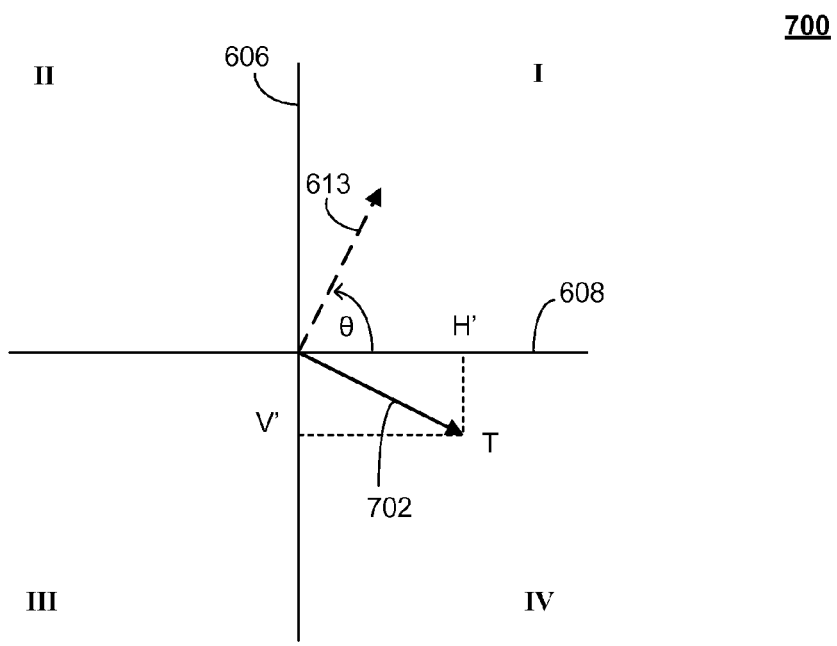

FIGS. 6 and 7 show polarization planes 600 and 700, respectively, for illustrating how a transmit polarization which is orthogonal to a sensed signal is synthesized. Referring to FIG. 6, there is shown a polarization vector composition using a vertical polarization axis 606 and horizontal polarization axis 608. FIG. 6 further shows the polarization of a protected signal 613 which is sensed at a secondary station, in accordance with an embodiment of the invention. The protected signal polarization has an angle θ 622 relative to the horizontal reference 608. The projection H of 613 onto the horizontal axis 608 scales the sensed signal by sin θ, while the projection V of 613 onto the vertical axis 606 scales the sensed signal polarization by cos θ. By measuring the relative amplitudes H, V on the two sensing antennas, the sensed signal's relative polarization can be determined. Because the same magnitude comparisons of projections can result for the relative polarization angles of −θ and 180°±θ, the relative electrical phases of the projections H, V of the sensed signal onto each axis 606, 608 should be measured. If the sign of the projections are the same, the sensed polarization 613 lies in the I and III quadrants of FIG. 6; if the sign of the projections are different, the sensed polarization 613 lies in the II and IV quadrants.

To synthesize an orthogonal transmit polarization T (702), as shown in FIG. 7, the signal transmitted by the secondary station requires a polarization angle of (90°−θ) with respect to the horizontal axis 608. The vertical component V' of T is given by V'=−H/(H$^2$+V$^2$), and the horizontal component H' of T is given by H'=V/(H$^2$+V$^2$). Alternatively, the vertical component can have the positive sign V'=H/(H$^2$+V$^2$) and the horizontal component can be negated, H'=−V/(H$^2$+V$^2$). Those skilled in the art will realize that to synthesize the desired orthogonal polarization, the transmit power may be divided proportionally between two orthogonally oriented antennas as determined by V' and H'.

If a circular polarization is transmitted by the primary station 110, as shown in FIG. 1, then for a sensing radio that has its horizontal and vertical antennas 108, 106 oriented in the plane of propagation, it will sense an equal magnitude on both antennas. When comparing the phase though, instead of finding a phase difference near 0° or near 180°, it will find phase differences near ±90° depending on the sense of the circular polarization. If a circular polarization was sensed as a TV channel (according to a database), then the secondary station should not chose to synthesize an orthogonal circular polarization since the overwhelming majority of TV receive antennas are horizontally polarized, and it is the receiver's antenna polarization that must be protected. However, in cases like point-to-point microwave, both the transmit and receive antennas can be circularly polarized, and in such case it would be desirable to synthesize the opposite sense circular polarization (e.g., utilize a right hand polarized transmission for a sensed left-hand polarized, signal) since the transmission of a linear polarization could not be rejected by a circularly polarized primary receive antenna. In the case of circular polarization, the opposite sense polarization is generated in the same way as for the linear polarizations; by negating the sign of one of either the vertical or horizontal component, except now negation means that instead of having co-phased or inverted phase signals on the two antennas for a linear polarization, the signals will differ by either + or −90°, depending on the original CP sense.

The previous alternatives to determining orientation apply to secondary stations which have the antennas mounted, for example, on a handheld station; when the user moves or changes orientation of the handheld device, the antennas move with the device and thus change position and orientation, relatively. Another alternative, for non-handheld mobile stations, is to fix the orientation of the antennas so that they will not appreciably change during operation, such as by mounting the antennas on a vehicle. However, there may be some cases where it is still desirable to sense antenna orientation of vehicle mounted antennas (e.g., on vehicles used in very hilly or mountainous terrain), or fixed device antennas (when the orientation of the installed antennas can vary, depending on the installation practice).

Figure 5:
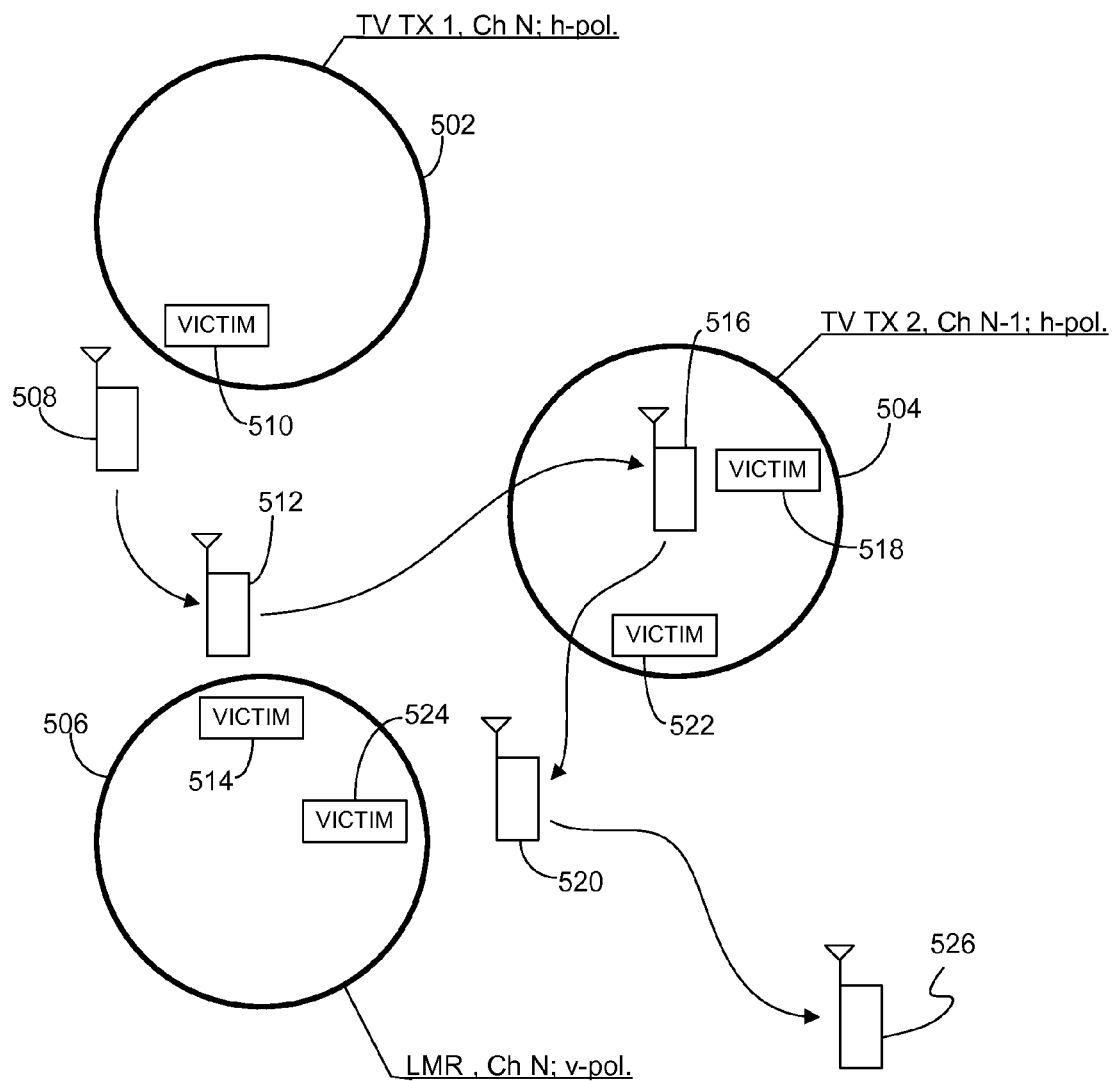
FIG. 5. show an example of adaptive antenna polarization as a mobile station moves through a region.

FIG. 5. shows an example of adaptive antenna polarization as a mobile secondary station moves through a region 500 to illustrate the process of sensing polarization of protected or other signals and synthesizing the appropriate transmit polarization to minimize the dominant interference effect of the secondary station. The region is occupied by three separate incumbent operators, which have coverage areas 502, 504, and 506. Coverage area 502 is a region in which a television broadcaster, TX1, transmits on channel N and has a horizontal polarization (h-pol). A mobile station in position 508 is outside the coverage area 502, as may be determined by a signal strength measurement or by some geographic boundary provided by a geo-location database. Near the mobile station, but within its interference range is a first incumbent receiver 510 which is receiving the signal transmitted by broadcaster TX1 using horizontal antenna polarization. The mobile station is also using channel N for communication, although, when the mobile station is a narrowband radio, it only occupies a sub-channel of channel N. To minimize interference at receivers within the coverage region 502 near the mobile station, the mobile station, upon performing a method of determining the appropriate polarization to use, commences transmission using a vertical polarization while at position 508. The vertical polarization may be maintained even if the mobile station is reoriented by selecting a different antenna when the orientation of the mobile station changes substantially.

Subsequently, the mobile station moves to position 512 and is nearby incumbent receiver 514, but outside coverage area 506. Coverage area 506, for the present example, is a region in which a land mobile radio (LMR) system operates, also on channel N, but using a vertical polarization (v-pol). At position 512, the mobile station also uses channel N, or more specifically, a sub-channel of wideband channel N, but upon performing a method for determining the presence and polarity of land the land mobile system operating in area 506, selects a horizontal polarization for use while communicating to reduce interference at incumbent receiver 514. Note that again, the indication of the polarity of the specific affected LMR system may be determined through geo-location database access or sensing measurements of the frequencies of interest. Regulatory requirements for a particular operational band and associated service may also be used to determine incumbent system polarity.

Subsequently, the mobile station moves to position 516, which is within coverage area 504, in which a television broadcaster TX2 is transmitting on channel N-1 using a horizontal polarization. Even though the mobile station is operating in channel N, the channel N-1 receiver is generally susceptible, due to finite selectivity, to adjacent channel interference and is close enough that it may be considered an incumbent for purposes of interference considerations. Accordingly, the mobile station uses a vertical polarization while in coverage area 504 to avoid interfering with nearby receivers such as incumbent receiver 518 which may be tuned to channel N-1.

The mobile station may then move to position 520 and is then in a position to interfere with both receiver 522 and 524. Incumbent receiver 522 is tuned to channel N-1 to receive the horizontally polarized television signal in coverage region 504, which incumbent receiver 524 is tuned to channel N to receive the vertically polarized land mobile radio signal in coverage area 506. Situated between coverage regions 504 and 506, the mobile station in position 520 must determine the dominant interference effect, as described above. Since the land mobile system is closer in frequency, as it, similar to the mobile station, operates in wideband channel N and it may be considered as the dominant interference effect (and ultimately limits allowable secondary unit transmission power level). Accordingly, the mobile station selects a horizontal polarization. While incumbent receiver 522 also uses a horizontal polarization, it is not the dominant interference effect in this particular example.

Finally, the mobile station may move to position 526, which is substantially removed from any incumbent signal on or near channel N. In the absence of any incumbent signals, the mobile station does not have to select a particular polarization configuration to reduce interference, or optimize performance when appropriate. Accordingly, the mobile station selects a polarization which allows the best link attributes with its association communication target, such as a base station.

In an embodiment of the invention, as is applicable to mobile as well as other secondary stations, a method of transmitting a signal in a secondary communications system commences by estimating a received signal polarization of a protected signal. The protected signal may be an incumbent primary signal or some other secondary operator signal which is to be protected. The method then commences by estimating an interference contribution to the protected signal by a secondary station transmission of the secondary communication system. The estimate may be determined with reference to information in a geo-location database indicating a location or region of operation of the protected signal. The estimate may also be made using sensed or measured signal characteristics. The method then commences by determining a transmission configuration at a secondary station that meets an interference contribution criteria. The interference criteria indicates the allowable interference effect on the protected signal. The transmission configuration refers to the signal characteristics of the signal then transmitted by the secondary station, and may affect signal characteristics such as signal polarization, signal power, phase, and so on. The secondary station may then commence transmitting using the determined transmission configuration. The secondary station may be provided with a plurality of antenna having different orientations. By apportioning power to one or more of the antennas and desired transmission polarization configuration can be achieved resulting in a transmitted signal having a desired polarization, and wherein the desired polarization reduces or minimizes the interference effect of the transmitted signal on the protected signal.

This invention can be embodied in other forms without departing from the spirit or essential attributes thereof. Accordingly, reference should be made to the following claims, rather than to the foregoing specification, as indicating the scope of the invention.

What is claimed is:

1. A method of transmitting a signal in a secondary communications system comprising:
   estimating, by a secondary mobile station in the secondary communications system, a received signal polarization of at least one protected signal in a primary spectrum of a primary communications system;
   estimating, by the secondary mobile station, an interference contribution by the secondary station transmission of the secondary communications system to the at least one protected signal of the primary communications system on the basis of the estimated received polarization signal of the at least one protected signal;
   determining, by the secondary mobile station, a transmission configuration of the secondary mobile station transmission in the primary spectrum of the primary communications system on the basis of estimated interference contribution, wherein the transmission configuration meets an interference contribution criteria, the interference contribution criteria being determined based at least on an acceptable desired to undesired interference protection ratio for the at least one protected signal of the primary communications system; and
   transmitting from the secondary mobile station using the determined transmission configuration.

2. The method of claim 1, wherein the transmission configuration comprises at least one of a transmission polarization configuration or a transmission power level.

3. The method of claim 2, wherein the transmission polarization configuration is selected based on an orientation sensor of the secondary station indicating an orientation of the secondary station.

4. The method of claim 2 wherein the transmission polarization configuration is selected among a plurality of antennas having different antenna polarizations.

5. The method of claim 2 wherein the transmission polarization configuration comprises a combination of a plurality of antenna polarizations of the secondary station.

6. The method of claim 1 wherein the interference contribution criteria comprises a maximum permissible interference effect on the protected signal at a particular location.

7. The method of claim 1, wherein the interference contribution criteria is selected to minimize the interference contribution to the protected signal.

8. The method of claim 1 wherein estimating the received signal polarization comprises accessing a geo-location database.

9. The method of claim 1 wherein estimating the received signal polarization comprises sensing on a plurality of antenna polarizations of the secondary station.

10. The method of claim 9, wherein the sensing comprises estimating an amplitude and phase of the protected signal for at least one of the antenna polarizations.

11. The method of claim 1, wherein the determined transmission configuration of the secondary mobile station is orthogonal to the estimated received polarization signal of the at least one protected signal of the primary communications system.

12. A method of transmitting a signal in a transmitter of a secondary mobile station of a secondary communications system comprising:
   sensing, by the secondary mobile station of the secondary communications system, an ambient radio environment on a candidate channel in a primary spectrum of a primary communications system using a plurality of antennas of the secondary mobile station, each of the plurality of antennas having a unique polarization;
   selecting, by the secondary mobile station, one antenna of the plurality of antennas of the secondary mobile station by:
      when an incumbent signal is detected on the candidate channel, selecting an antenna from the plurality of antennas having a lowest matching polarization with the incumbent signal for subsequent transmission by the secondary mobile station on the candidate channel in the primary spectrum of the primary communications system; and
      when no incumbent signal is detected on the candidate channel, selecting an antenna from the plurality of antennas that has a highest matching polarization with a receiving station to which the secondary mobile station is transmitting on the candidate channel in the primary spectrum of the primary communications system.

13. The method of claim 12, wherein the sensing and selecting are repeated periodically.

14. The method of claim 12, wherein the incumbent signal is detected adjacent to the candidate channel.

15. The method of claim 12, wherein the incumbent signal is detected in the candidate channel.

16. The method of claim 12, wherein the plurality of antennas comprises first and second antennas having orthogonal polarization with respect to each other.

17. A method of operating a secondary station in a secondary communications system, comprising:
   determining, at the secondary station of the secondary communications system, a polarization of an incumbent signal on a candidate channel in a primary spectrum of a primary communications system; and
   configuring a transmitter of the secondary station of the secondary communications system to transmit on the candidate channel in the primary spectrum of the primary communications system such that at least a majority of transmit power is routed to one of a plurality of antennas having a lowest matching polarization relative to the polarization of the incumbent signal.

18. The method of claim 17, wherein determining the polarization of the incumbent signal comprises querying a geo-location database of incumbent signals and receiving signal parameters of the incumbent signal from the geo-location database, and wherein the signal parameters comprise a polarization indication parameter.

19. The method of claim 18 wherein configuring the transmitter comprises selecting only the antenna having the lowest matching polarity.

20. The method of claim 18, wherein determining the polarization comprises receiving the incumbent signal at each of the plurality of antennas, wherein the antenna having the lowest received signal strength is selected as the antenna having the lowest matching polarization.

21. The method of claim 18, wherein the mobile station comprises an orientation sensor, configuring the transmitter comprises:
   determining an orientation of the mobile station as indicated by the orientation sensor; and
   selecting one of the plurality of antennas having a polarization most opposite of the polarization of the incumbent signal.

22. The method of claim 18, wherein determining the polarization and configuring the transmitter are repeated.

23. A cognitive secondary station in a secondary communications system, comprising:
   a transceiver;

a plurality of antennas, each of the plurality of antennas able to be selectively coupled to the transceiver, and having a unique polarization relative to the cognitive secondary station; and a controller configured to operate the transceiver and selectively couple at least one of the plurality of antennas to the transceiver in response to the cognitive secondary station determining a polarization of an incumbent signal on a channel in a primary spectrum of a primary communications system which the transceiver is configured to operate, and wherein the at least one of the plurality of antennas has a lowest matching polarization with the incumbent signal.

* * * * *